US012362113B2

(12) United States Patent
Arrighetti et al.

(10) Patent No.: US 12,362,113 B2
(45) Date of Patent: Jul. 15, 2025

(54) LOW VOLTAGE SWITCH POLE

(71) Applicant: ABB S.p.A., Milan (IT)

(72) Inventors: Pierantonio Arrighetti, Bossico (IT); Pierre Corfdir, Wettingen (CH); Markus Abplanalp, Baden-Dättwil (CH); Ralf-Patrick Suetterlin, Baden (CH)

(73) Assignee: ABB S.p.A., Milan (IT)

( * ) Notice: Subject to any disclaimer, the term of this patent is extended or adjusted under 35 U.S.C. 154(b) by 130 days.

(21) Appl. No.: 17/982,744

(22) Filed: Nov. 8, 2022

(65) Prior Publication Data

US 2023/0207238 A1 Jun. 29, 2023

(30) Foreign Application Priority Data

Nov. 8, 2021 (EP) .................................... 21207012

(51) Int. Cl.
*H01H 33/10* (2006.01)
*H01H 33/64* (2006.01)

(52) U.S. Cl.
CPC ............. *H01H 33/10* (2013.01); *H01H 33/64* (2013.01)

(58) Field of Classification Search
CPC ........ H01H 33/10; H01H 33/04; H01H 33/64; H01H 9/36; H01H 9/362; H01H 9/346; H01H 9/342; H01H 9/30; H01H 9/34; H01H 2009/348; H01H 1/64; H01H 9/345; H01H 2009/365; H01H 73/18
USPC ..... 218/151, 149, 148, 155–158, 22–14, 38, 218/36, 105
See application file for complete search history.

(56) References Cited

U.S. PATENT DOCUMENTS

| | | | | |
|---|---|---|---|---|
| 7,488,915 B2 * | 2/2009 | Pollitt | H01H 9/342 335/201 |
| 8,772,665 B2 * | 7/2014 | An | H01H 9/346 218/16 |
| 9,715,979 B2 * | 7/2017 | Bresciani | H01H 33/42 |

(Continued)

FOREIGN PATENT DOCUMENTS

| | | |
|---|---|---|
| CN | 107644795 A | 1/2018 |
| CN | 109360755 A | 2/2019 |
| EP | 3734631 A1 | 11/2020 |

OTHER PUBLICATIONS

European Extended Search Report, Application No. 21207012.2, dated May 6, 2022, 9 pps.

*Primary Examiner* — William A Bolton
(74) *Attorney, Agent, or Firm* — McCarter & English, LLP; Michael M. Gnibus

(57) ABSTRACT

A switch pole for a low voltage switching device including an insulating casing defining an internal space with a contact area and an arc extinguishing area of said switch pole, a fixed contact assembly and a movable contact assembly positioned in said contact area and including, respectively, one or more fixed contacts and one or more movable contacts, which can be mutually coupled or uncoupled, and an arc chamber positioned in said arc extinguishing area and including a plurality of parallel arc-breaking plates and a terminal arc-breaking element, which includes a plate portion arranged in parallel to said arc-breaking plates and having one or more through openings and an elongated portion protruding from said plate portion and extending across said arc-extinguishing area, from said plate portion towards said fixed contact assembly.

13 Claims, 12 Drawing Sheets

(56) References Cited

U.S. PATENT DOCUMENTS

| | | | | |
|---|---|---|---|---|
| 10,665,403 | B2 * | 5/2020 | Rival | H01H 33/74 |
| 2006/0151439 | A1 * | 7/2006 | Shea | H01H 9/346<br>218/149 |
| 2011/0297649 | A1 * | 12/2011 | An | H01H 9/362<br>218/156 |
| 2015/0136740 | A1 * | 5/2015 | Afshari | H01H 9/342<br>218/157 |
| 2017/0053758 | A1 | 2/2017 | Rival et al. | |
| 2021/0241981 | A1 * | 8/2021 | Arrighetti | H01H 9/342 |

* cited by examiner

LOW VOLTAGE SWITCH POLE

CROSS REFERENCE TO RELATED APPLICATIONS

This patent application claims the benefit and priority of European Patent Application No. 21207012.2 filed on Nov. 8, 2021, the disclosure of which is incorporated by reference herein in its entirety as part of the present application.

BACKGROUND

The present disclosure relates to a switch pole for a switching device to be used in low-voltage electrical systems. The disclosure likewise relates to a switching device including one or more of said switch poles.

Low voltage switching devices, such as for example circuit breakers, disconnectors, contactors, or the like, include one or more switch poles, each including one or more fixed contacts and movable contacts that can be coupled to and uncoupled from one another.

Switching devices of the known art also include driving means designed to move the movable contacts relative to said fixed contacts, so that these electric contacts can be mutually couple or uncoupled, thereby allowing or preventing electric currents to flow along the switch poles. The driving means include, for instance, mechanisms, which terminate, for example, in a shaft operatively connected to said movable contacts.

As is known, during an opening maneuver of a switching device, electric arcs may arise between the electric contacts under separation of the switch poles, particularly under stress conditions (e.g. in presence of overload currents or short-circuit currents).

In order to break currents circulating along the switch poles, such arcing phenomena have to be extinguished as quickly as possible. To this aim, a switching device generally includes, for each switch pole, an arc chamber including a number of arc-breaking elements positioned near the electric contacts and designed to cool and split possible electric arcs raising between the electric contacts.

A problem normally present in switching devices of known type consists in that an uneven distribution of electric arcs among the arc-breaking elements of the arc chamber often occurs during opening maneuvers. As a result, the arc-quenching action exerted by the arc-breaking elements is not uniform and efficient.

Additionally, since electric arcs may bypass some arc-breaking areas or elements, some parts of the arc chamber may be subject to higher concentrations of electrical and mechanical stresses and to higher temperatures. These events may adversely affect the lifetime of the arc chamber and lead to an early decay of its functionalities, thereby remarkably limiting the overall performances of the switching device.

Moreover, since they are not uniformly distributed among the arc-breaking elements, electric arcs may sometime "jump" towards other conductive parts of the switch pole, which are located outside the arc-extinguishing area of the switch pole. Obviously, possibly affected components may be subject to serious damages, since they are not generally designed to bear high electric and thermal stresses.

The above-mentioned problems of the available solutions of the state of the art are even made more critical by the circumstance that, in modern electric power distribution grids, switching devices are often brought to operate to relatively high operating voltages (e.g. about 1-1.5 kV).

Electric arcs with higher energy content may therefore arise between the electric contacts under separation during opening maneuvers.

BRIEF DESCRIPTION

Embodiments of the present disclosure provide a switch pole for low voltage switching devices, which allows overcoming or mitigating the above-mentioned shortcomings.

In particular, the present disclosure provides a switch pole, in which a more uniform utilization of the arc-breaking elements of the arc chamber is ensured.

Another aspect of the present disclosure provides a switch pole, in which arcing phenomena towards parts outside the arc-extinguishing area of the switch pole are prevented or remarkably reduced.

Another aspect of the present disclosure provides a switch pole that is reliable in operation and relatively easy and cheap to manufacture at industrial level.

The above aim and purposes, as well as other purposes that will emerge clearly from the following description and attached drawings, are provided, according to the disclosure, by a switch pole for a low voltage switching device, according to the following claim 1 and the related dependent claims.

In a general definition, the switch pole, according to the disclosure includes an insulating casing, which defines an internal space including a contact area and an arc extinguishing area.

The switch pole, according to the disclosure, further includes a fixed contact assembly and a movable contact assembly positioned in the contact area of the switch pole.

The fixed contact assembly and the movable contact assembly include, respectively, one or more fixed contacts and one or more movable contacts, which can be mutually coupled or uncoupled.

The fixed contact assembly may be arranged at a rear wall of the insulating casing.

The movable contact assembly of the switch pole may be reversibly movable between a first position, in which said movable contacts are coupled to said fixed contacts, and a second position, in which said movable contacts are spaced apart from said fixed contacts.

The switch pole, according to the present disclosure, further includes an arc chamber positioned in the arc extinguishing area of the switch pole.

The arc chamber includes a plurality of arc-breaking elements, which include a plurality of parallel arc-breaking plates and a terminal arc-breaking element.

The arc chamber may include an insulating enclosure that can be removably fixed to the outer insulating casing of the switch pole. Advantageously, the arc-breaking elements of the arc chamber are fixed to said insulating enclosure.

The arc-breaking plates may be arranged at subsequent positions between a front wall and a rear wall of the insulating casing.

The arc-breaking plates may be formed by contoured plates made of metal or other conductive material.

The terminal arc-breaking element is instead arranged in distal position from the above-mentioned fixed contact assembly in comparison to the arc-breaking plates.

The terminal arc-breaking element may be arranged at a front wall of the insulating casing, thereby in an opposite position with respect to the fixed contact assembly of the switch pole.

The terminal arc-breaking element may be arranged in proximal position to the contact area of the switch pole, in comparison to said arc-breaking plates.

According to the disclosure, the terminal arc-breaking element includes a plate portion, which is arranged in parallel to the arc-breaking plates and has one or more through openings, and an elongated portion, which protrudes from said plate portion and extends across the arc-extinguishing area of the switch pole from said plate portion towards the fixed contact assembly of the switch pole.

The elongated portion of the terminal arc-breaking element may be positioned transversally to a plurality arc-breaking plates located in proximity of the plate portion of the terminal arc-breaking element.

The elongated portion of the terminal arc-breaking element may protrude from the plate portion at a lower edge of said plate portion, which is in proximal position to said contact area.

The elongated portion of the terminal arc-breaking element may have a first end joined to said plate portion and a second free end, which is curved towards said contact area.

The terminal arc-breaking element may be formed by a folded plate made of metal or other conductive material and including the above-mentioned plate portion and elongated portion.

The arrangement of a terminal arc-breaking element as defined above provides relevant advantages.

During an opening maneuver of the switching device, the elongated portion of the arc-breaking element catches and drives possible electric arcs formed between the electric contacts under separation towards a terminal portion of the arc chamber, where the above-mentioned plate portion is located. Electric arcs are thus urged to develop throughout the whole arc chamber, thereby involving all the arc-breaking plates of this latter.

The path followed by said electric arcs during the opening maneuver is thus remarkably lengthened, which greatly favor the cooling of said electric arcs.

On the other hand, the arrangement of suitable openings in the plate portion of the terminal arc-breaking element improves the fluid dynamics inside the arc chamber by making hot gases (generated by high energy ionization effects of air filling the switch pole) flow away from the contact area of the switch pole, towards a front wall and a top wall of the insulating casing.

Such a movement of the hot gas contributes to driving electric arcs throughout the arc chamber in such a way to move them away from the contact area and involve the arc-breaking elements of the arc chamber.

The openings provided in the plate portion of the terminal arc-breaking element thus synergically cooperate with the elongate portion of this latter to drive electric arcs away from the contact area and lengthen their path during an opening maneuver of the switching device.

Besides, the improved flow of hot gases from the contact area to the arc extinguishing area, which is caused by the openings of the plate portion of the terminal arc-breaking element, exerts a remarkable cooling action on the movable contacts of the switch pole.

According to example embodiments of the present disclosure, the insulating casing of the switch pole includes an insulating wall partially separating the contact area from the arc extinguishing area of the switch pole, in distal position from the fixed contact assembly.

Advantageously, said terminal arc-breaking element leans on said insulating wall, at least at the above-mentioned elongated portion. In this way, the insulating wall supports the terminal arc-breaking element, thereby favoring the arrangement of the arc chamber.

The insulating wall may be integral with a front wall and opposite lateral walls of said insulating casing and extends from said front wall towards said fixed contact assembly.

A curved free end of the elongated portion of the terminal arc-breaking element of the arc chamber may protrude from said insulating wall in such a way to be exposed directly to the contact area.

BRIEF DESCRIPTION OF THE DRAWINGS

Further features and advantages of the present disclosure will be evident from the description of example but not exclusive embodiments of a switch pole, according to the present disclosure, shown by way of examples in the accompanying drawings, wherein.

DETAILED DESCRIPTION

Figure 1:
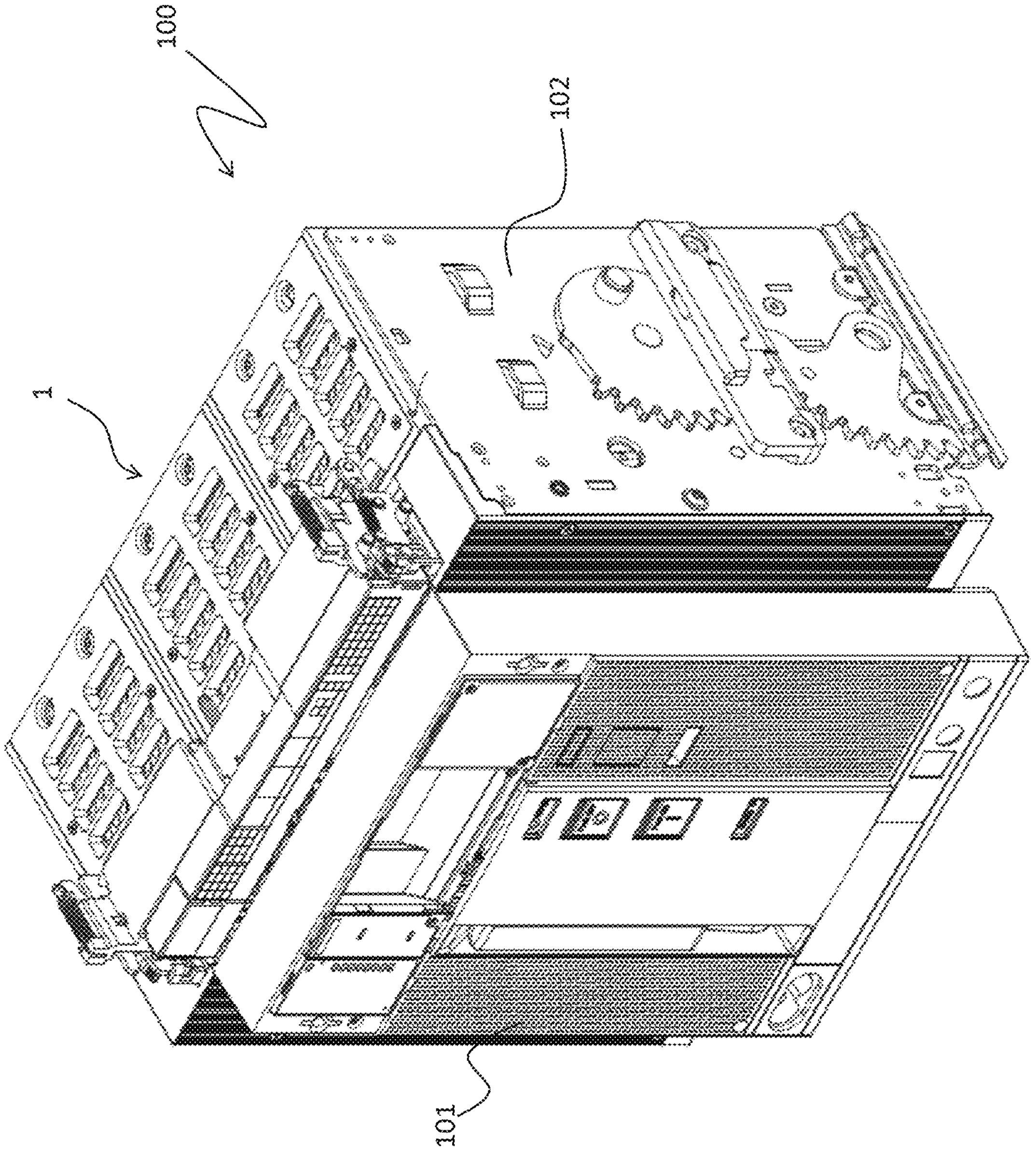
FIG. 1 is a perspective view of a low voltage switching device including a low voltage switch pole according to the present disclosure.

With reference to the attached figures, the present disclosure relates to a switch pole 1 for a low voltage switching device 100, e.g. a circuit breaker, a disconnector, a contactor, or the like.

The switching device 100 is particularly adapted for use in AC low voltage electrical systems and it will be described with particular reference to these applications. However, in principle, it may be used also in electric systems of different type, e.g. in DC low voltage electrical systems.

For the purposes of the present disclosure, the term "low voltage" typically relates to operating voltages up to 1.5 kV AC and 2 kV DC.

The switching device 100 includes one or more switch poles 1, according to the disclosure.

The number of switch poles may vary, according to the needs. In the embodiments shown in the cited figures, the switching device 100 is of the three-phase type and it includes three switch poles. However, according to other embodiments of the disclosure (not shown), the switching device 100 may include a different number of switch poles depending on the number of electric phases of the electric circuit, in which it has to be installed.

Each switch pole 1 of the switching device 100 includes an insulating casing 2, which defines an internal space including a contact area 3 and an arc extinguishing area 4.

In general, the contact area 3 is an area of the switch pole where the contact assemblies of the switch pole are arranged and operated. On the other hand, the arc-extinguishing area 4 is an area of the switch pole where there are arranged arc-quenching means designed to extinguish possible electric arcs arising between the electric contacts of the switch pole, during the opening maneuvers of the switching device 100.

As shown in the cited figures, the contact area 3 and an arc extinguishing area 4 are adjacent and communicate one to another, such that a gas can flow between these areas.

The arc extinguishing area 4 may be positioned at un upper level with respect to the contact area 3, i.e. in proximal position relative to a top side of this latter.

Figure 2:
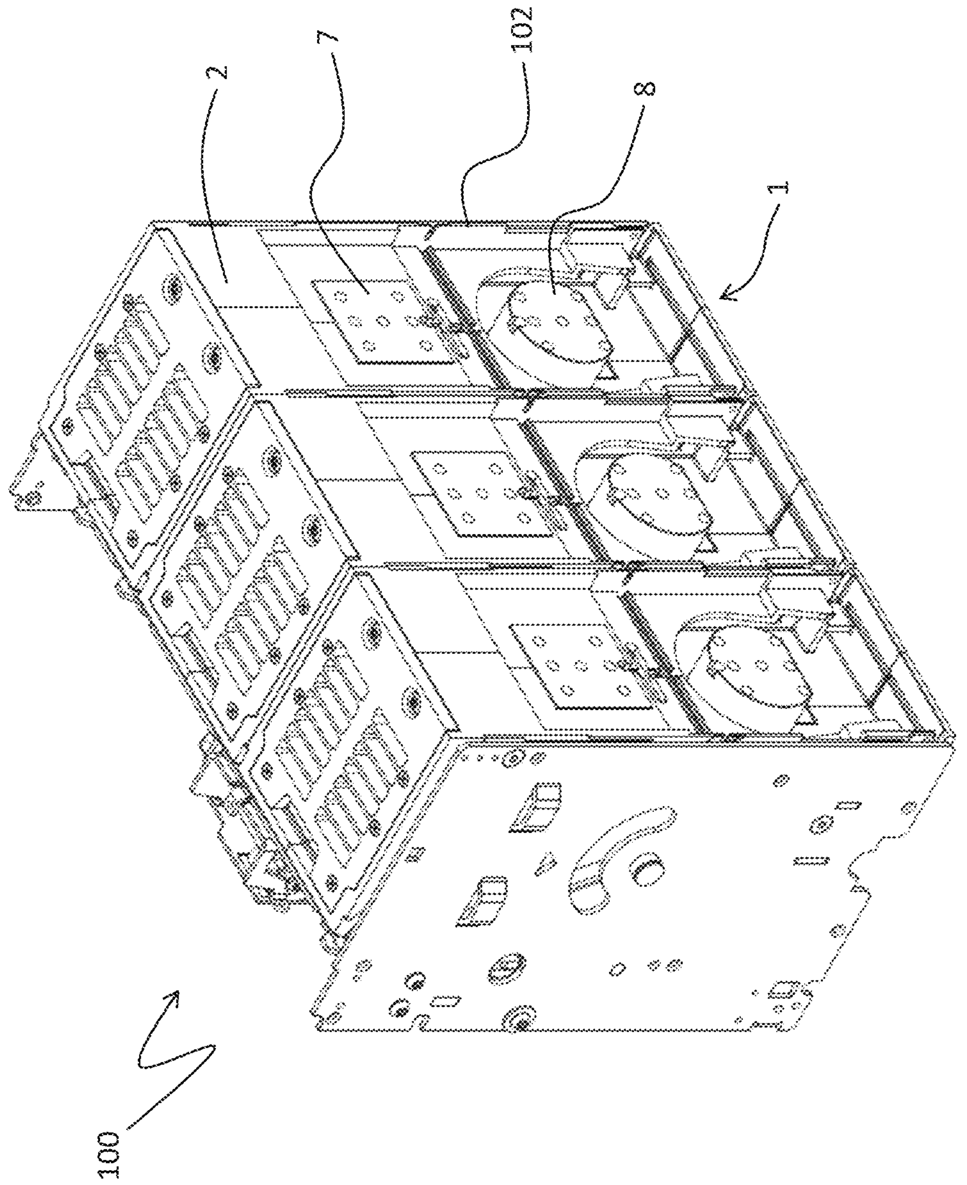
FIG. 2 is a perspective view showing the switch poles of the switching device of FIG. 1.

For the sake of clarity, it is specified that relative terms used in this disclosure, e.g. “front”, “rear”, “lateral”, “upper”, “lower”, “top” and “bottom”, relate to the switch pole 1 in its normal installation conditions, namely in the “vertical” installation shown in FIGS. 1-2.

The insulating casing 2 of the switch pole is shaped as a contoured box, with opposite first and second lateral walls 21, 22, opposite front and rear walls 23, 24 and opposite top and bottom walls 25, 26.

As shown in the attached figures, the insulating casing 2 includes first and second half shells coupled to each other so as to form said insulating casing. In practice, a first half shell comprises the first lateral wall 21, a portion of the front wall 23, a portion of the rear wall 24, and a portion of the bottom wall 26, while a second half shell comprises the second lateral wall 22, a portion of the front wall 23, a portion of the rear wall 24, and a portion of the bottom wall 26.

According to these embodiments of the disclosure, the top wall 25 of the insulating casing 2 is fixed to an insulating enclosure 43 of another component 40 (the arc chamber) of the switch pole and it may be removably installed in the switch pole together with such a component.

However, according to other embodiments of the disclosure (not shown), the insulating casing 2 of the switch pole may be arranged differently. For example, the top wall 25 of the insulating casing 2 may be integral with other walls of the insulating casing or it may be self-standing so as to be removably couplable with other walls of the insulating casing.

The top wall 25 of the insulating casing 2 may be provided with a number of through openings to allow the exit of hot gases from the internal volume of the switch pole, in particular from the arc extinguishing area 4.

The insulating casing 2 is made of an electrically insulating material, e.g. a thermosetting or thermoplastic material.

The switch pole 1 includes a fixed contact assembly 31 and a movable contact assembly 32, which are positioned in the contact area 3 of the switch pole.

The fixed contact assembly 31 includes one or more fixed contacts 311, which may be formed by suitable conductive plates.

In the embodiments shown in the cited figures, the fixed contact assembly 31 includes a pair of fixed contacts 311 (conductive tips or plates), which may be positioned at the rear wall 24 of the insulating casing 2 of the switch pole. However, according to other embodiments of the disclosure (not shown), the fixed contact assembly may include a different number of electric contacts.

In general, the fixed contact assembly 31 may be realized according to solutions of known type and it will be described hereinafter only with reference to the aspects of interest of the disclosure, for the sake of brevity.

The movable contact assembly 32 includes one or more movable contacts 321, which may be formed by suitable conductive fingers provided with suitable contact tips.

The movable contacts 321 can be mutually coupled or uncoupled to the fixed contacts 311. To this aim, the movable contact assembly 32 is reversibly movable between a first position (FIG. 4), in which the movable contacts 321 are coupled to the fixed contacts 311, and second position (FIG. 5), in which the movable contacts 321 are fully spaced from the fixed contacts 311.

The first position of the movable contacts 321 of each electric pole corresponds to a close condition of the switching device 100, in which electric currents are allowed to flow along the electric poles whereas second position of the movable contacts 321 of each electric pole corresponds to an open condition of the switching device 100, in which electric currents along the electric poles are interrupted.

A transition of the movable contacts 321 of each electric pole from the above-mentioned first position to the above-mentioned second position constitute an opening maneuver of the switching device 100 whereas an opposite transition of the movable contacts 321 of each electric pole from the above-mentioned second position to the above-mentioned first position constitute a closing maneuver of the switching device 100.

In the embodiments shown in the cited figures, the movable contact assembly 32 includes a pair of movable contacts 321. However, according to other embodiments of the disclosure (not shown), the movable contact assembly may include a different number of electric contacts.

The movable contact assembly 32 includes a supporting structure 322 for supporting the electric contacts 321, which conveniently rotates about a suitable rotation axis, so as to allow engagement/disengagement of the movable contacts 321 to or from the fixed contacts 311 of the fixed contact assembly 31.

The supporting structure 322 conveniently includes a connecting element 323, which protrudes outside the insulating casing 2 of the switch pole (preferably from a suitable window in the front wall 23) for connection with a driving mechanism (not shown) designed to move the movable contact assembly 32 of each switch pole.

In general, the movable contact assembly 32 may be realized according to solutions of known type and it will be described hereinafter only with reference to the aspects of interest of the disclosure, for the sake of brevity.

Each switch pole 1 includes a first pole terminal 7 and a second pole terminal 8 that are electrically coupled with the fixed contacts 311 and the movable contacts 321 of the fixed contact assembly 31 and the movable contact assembly 32, respectively.

In operation, the pole terminals 7, 8 are electrically coupled with corresponding line conductors of an electric line. Such line conductors are, in turn, electrically connected to an electric power source (e.g. an electric power feeding or generation system or a section of electric grid) and to an electric load (e.g. an electric system or apparatus or a section of electric grid).

The pole terminals 7, 8 are positioned at the rear wall 24 of the insulating casing 2 of the switch pole.

In general, the pole terminals 7, 8 may be realized according to solutions of known type and it will be described hereinafter only with reference to the aspects of interest of the disclosure, for the sake of brevity.

According to some embodiments of the disclosure (shown in the cited figures), the switch pole 1 includes an elongated conductive plate 9 (e.g. formed by a metal plate), which is electrically connected to the fixed contacts 311 of the fixed contact assembly 31.

The conductive plate 9 extends from the fixed contacts 311 towards the arc extinguishing area 4 and it is arranged at the rear wall 24 of the insulating casing 2, thereby extending between the contact area 3 and the arc extinguishing area 4.

According to the disclosure, the switch pole 1 includes an arc chamber 40 positioned in the arc extinguishing area 4 of the switch pole, conveniently above the contact area 3.

The arc chamber 40 includes a plurality of arc-breaking elements 41, 42 designed to extinguish possible electric arcs raising between the electric contacts 311, 312 when these latter are separated during an opening maneuver of the switching device 100.

In the embodiments shown in the cited figures, the arc chamber 40 may be formed by a self-standing structure that can be removably installed in the corresponding switch pole. In this case, the arc chamber 40 includes an insulating enclosure 43 (made of an electrically insulating material, e.g. a thermosetting or thermoplastic material), which can be removably fixed to the insulating casing 2 of the switch pole. The arc-breaking elements 41, 42 are conveniently fixed to the insulating enclosure 43.

The top wall 25 of the insulating casing 2 may be fixed to the insulating casing 43 of the arc chamber 40. In this way, it can be installed or removed together with the arc chamber 40.

In the following, the arc chamber 40 will be described with reference to the above-illustrated embodiments of the disclosure for the sake of brevity only. Indeed, according to other embodiments of the disclosure (not shown), the arc chamber 40 may be simply formed by a region of the arc extinguishing area 4 of the switch pole, in which the arc-breaking elements 41, 42 are arranged, for example by fixing them to the insulating casing 2 through suitable supports.

The arc-breaking elements of the arc chamber 40 include a plurality of arc-breaking plates 41, which are arranged in parallel one to another, along reference planes parallel to the front and rear walls 23, 24 of the insulating casing 2.

The arc-breaking plates 41 may be arranged at subsequent positions between the front and rear walls 23, 24 of the insulating casing 2, in particular at increasing distances from the fixed contact assembly 31.

Figure 10:
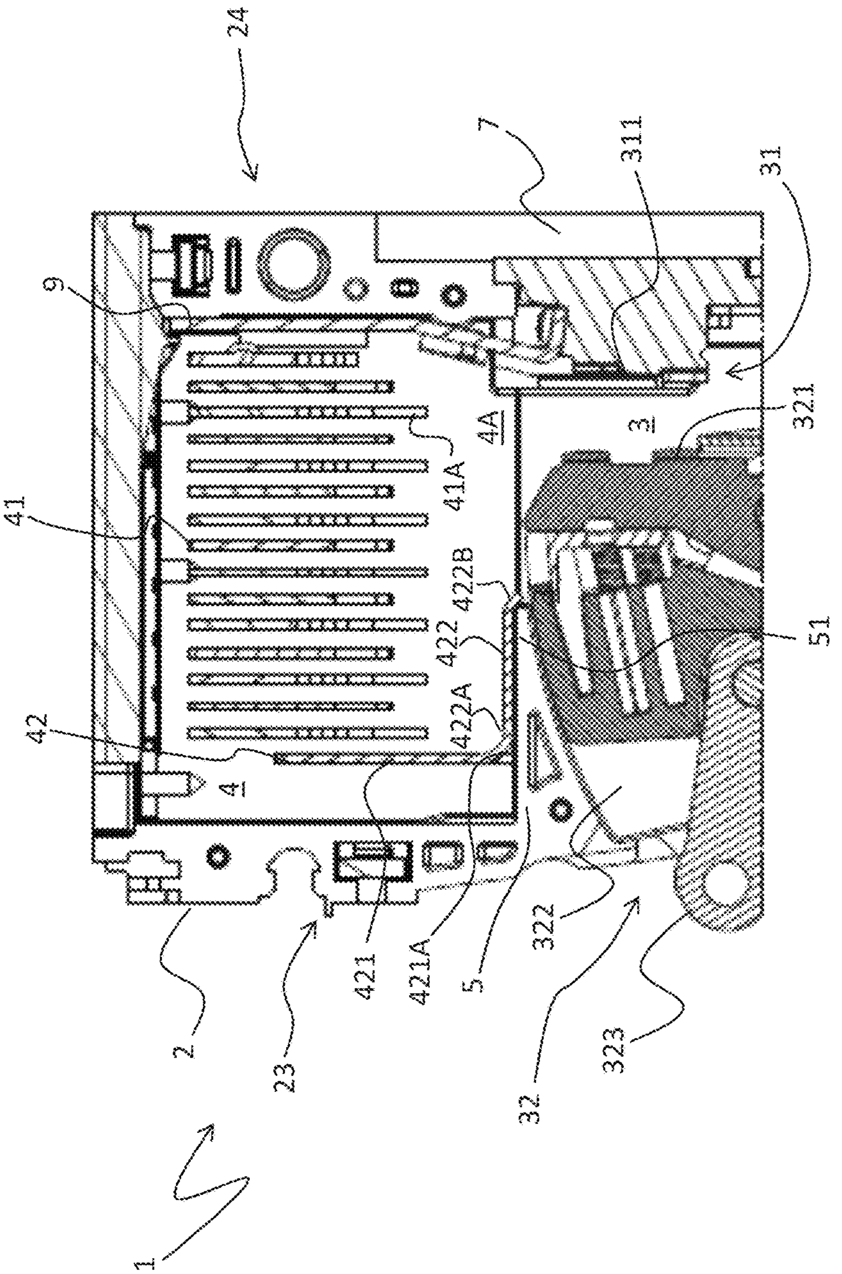
Figure 11:
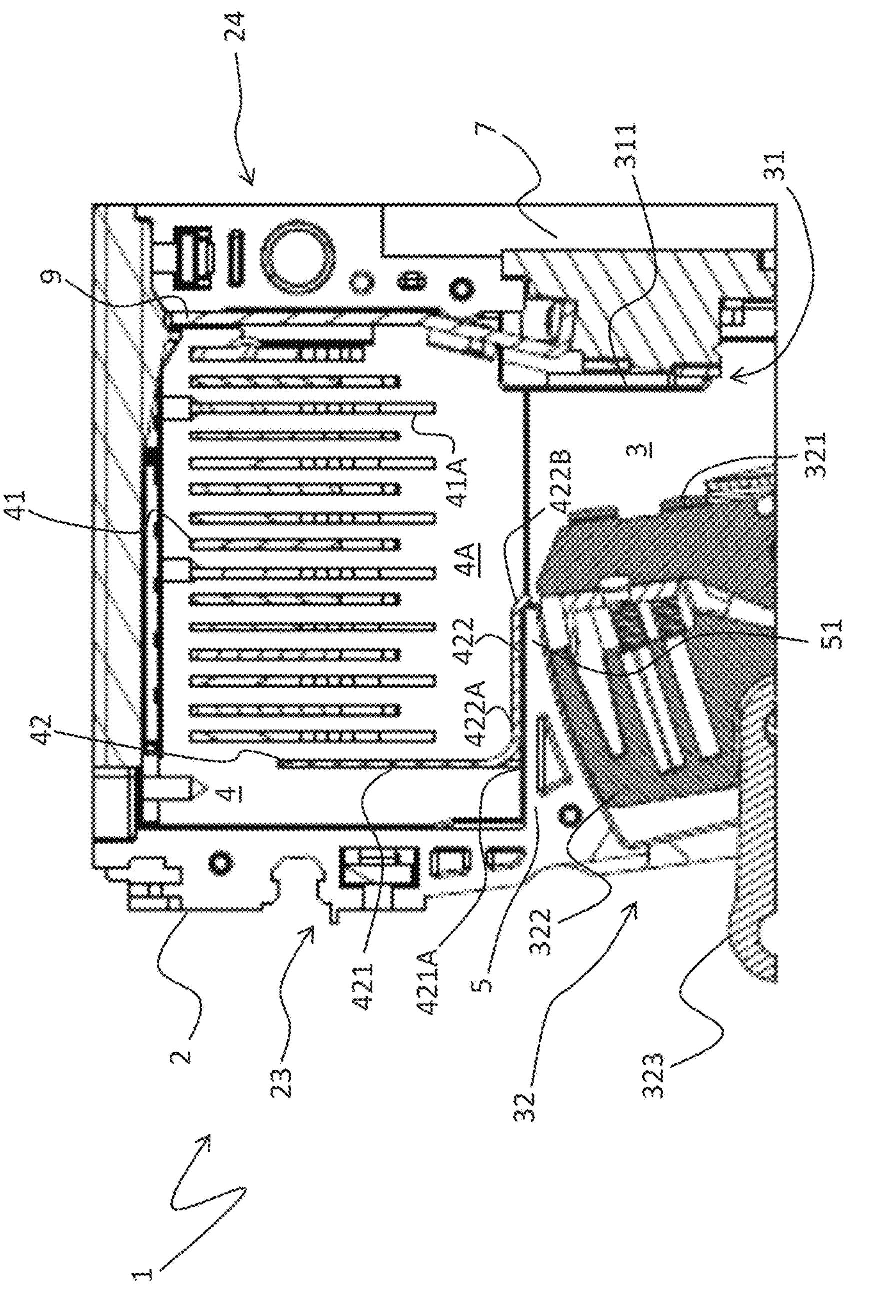

The arc-breaking plates 41 may be arranged at a given distance from the contact area 3, so that there is a gap region 4A of the arc extinguishing area 4, which separates the contact area 3 and the arc-breaking plates 41 (FIGS. 10-11).

The arc-breaking plates 41 may be arranged at different distances from the contact area 3. For example, as shown in the cited figures, arc-breaking plates 41 having their lower edge 41A at a first distance from the contact area 3 may be alternated with arc-breaking plates 41 having their lower edge 41A at a second distance from the contact area 3, wherein said second distance is shorter than said first distance (FIGS. 10-11).

The arc-breaking plates 41 may be formed by contoured plates made of metal or other conductive material, which can have different dimensions and shapes according to the needs.

According to the embodiments shown in the cited figures, the arc-breaking plates 41 may be fixed to the insulating enclosure 43 of the arc chamber.

The arc-breaking elements of the arc chamber 40 include a terminal arc-breaking element 42, which is arranged in distal position from the fixed contact assembly 31 compared to the arc-breaking plates 41.

The terminal arc-breaking element 42 may be arranged at the front wall 23 of the insulating casing 2, thereby in an opposite position with respect to the rear wall 24, where the fixed contact assembly 31 is arranged.

The terminal arc-breaking element 42 may be arranged in proximal position to the contact area 3 compared to the arc-breaking plates 41, thereby being in proximity of the contact area 3.

In general, as it is evident from the cited figures, the arc-breaking element 42 delimits the arc chamber 40 at the front wall 23 of the insulating casing 2.

The terminal arc-breaking element 42 may be formed by a folded plate made of metal or other conductive material.

According to the disclosure, the terminal arc-breaking element 42 includes a plate portion 421, which is arranged parallel to the arc-breaking plates 41 of the arc chamber.

The plate portion 421 of the terminal arc-breaking element 42 is arranged in distal position from the fixed contact assembly 31 compared to the arc-breaking plates 41.

The plate portion 421 of the terminal arc-breaking element 42 may be arranged in proximal position to the contact area 3 compared to the arc-breaking plates 41. The plate portion 421 is thus located at a lower level with respect to the other arc-breaking plates 41. In practice, the distance between a lower edge 421A of the plate portion 421 the contact area 3 is very shorter than the distance between a lower edge 41A of a generic arc-breaking plate 41 and the contact area 3 (FIGS. 10-11).

A lower edge 421A of the plate portion 421 is located at a gap region 4A of the arc extinguishing area 4, which separates the contact area 3 and the arc-breaking plates 41, more particularly at the border between the arc contact area 3 and the arc extinguishing area 4 (FIGS. 10-11).

In principle, the shape of the plate portion 421 may be any, according to the needs.

Figure 12:
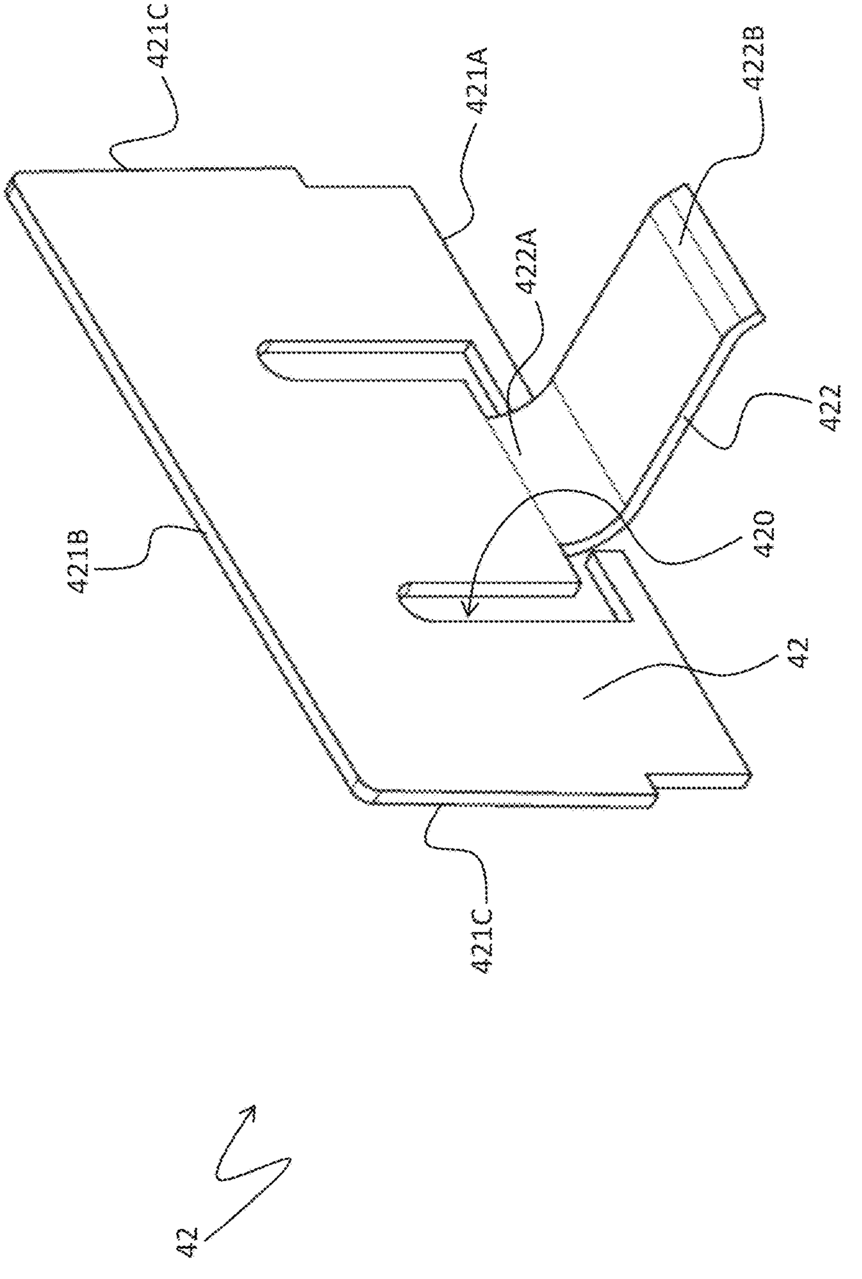
FIG. 12 is a perspective view of a terminal arc-breaking element of the switch pole according to the present disclosure.

The plate portion 421 may have a rectangular shape, with opposite lower and upper edges 421A, 421B and opposite lateral edges 421C (FIG. 12).

The lower and upper edges 421A, 421B of the plate portion 421 are arranged perpendicular to the lateral walls 21, 22 of the insulating casing 2 and are located in a proximal position and in a distal position relative to the contact area 3 of the switch pole, respectively.

The lateral edges 421C of the plate portion 421 are instead arranged perpendicular to the top and bottom walls 25, 26 of the insulating casing 2.

The lateral edges 421C of the plate portion 421 may have a stepped profile to favor the assembly of the arc-breaking element 42 on the insulating enclosure 43.

Figure 3:
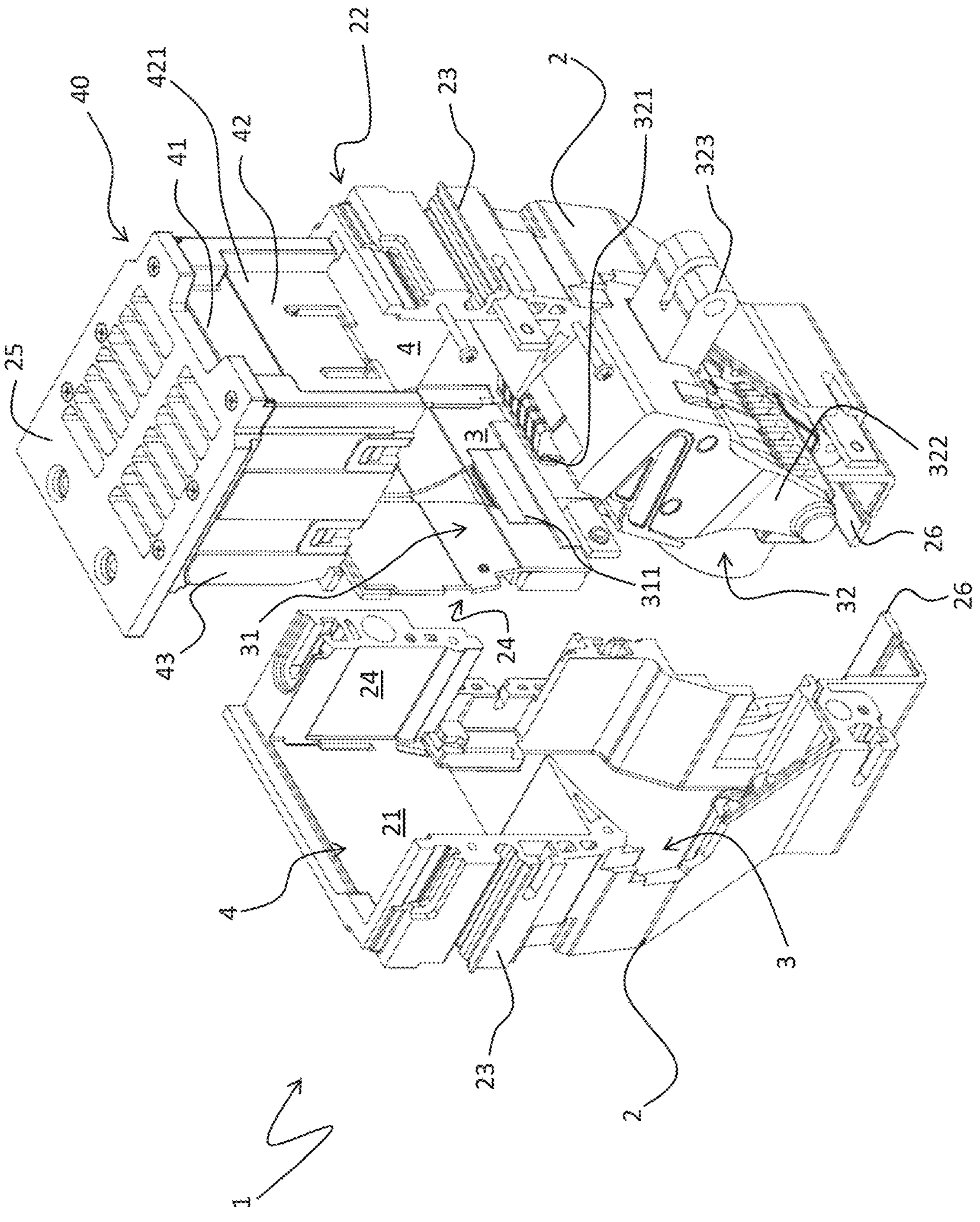
FIG. 3 is an exploded view of an embodiment of a switch pole according to the present disclosure.
Figure 4:
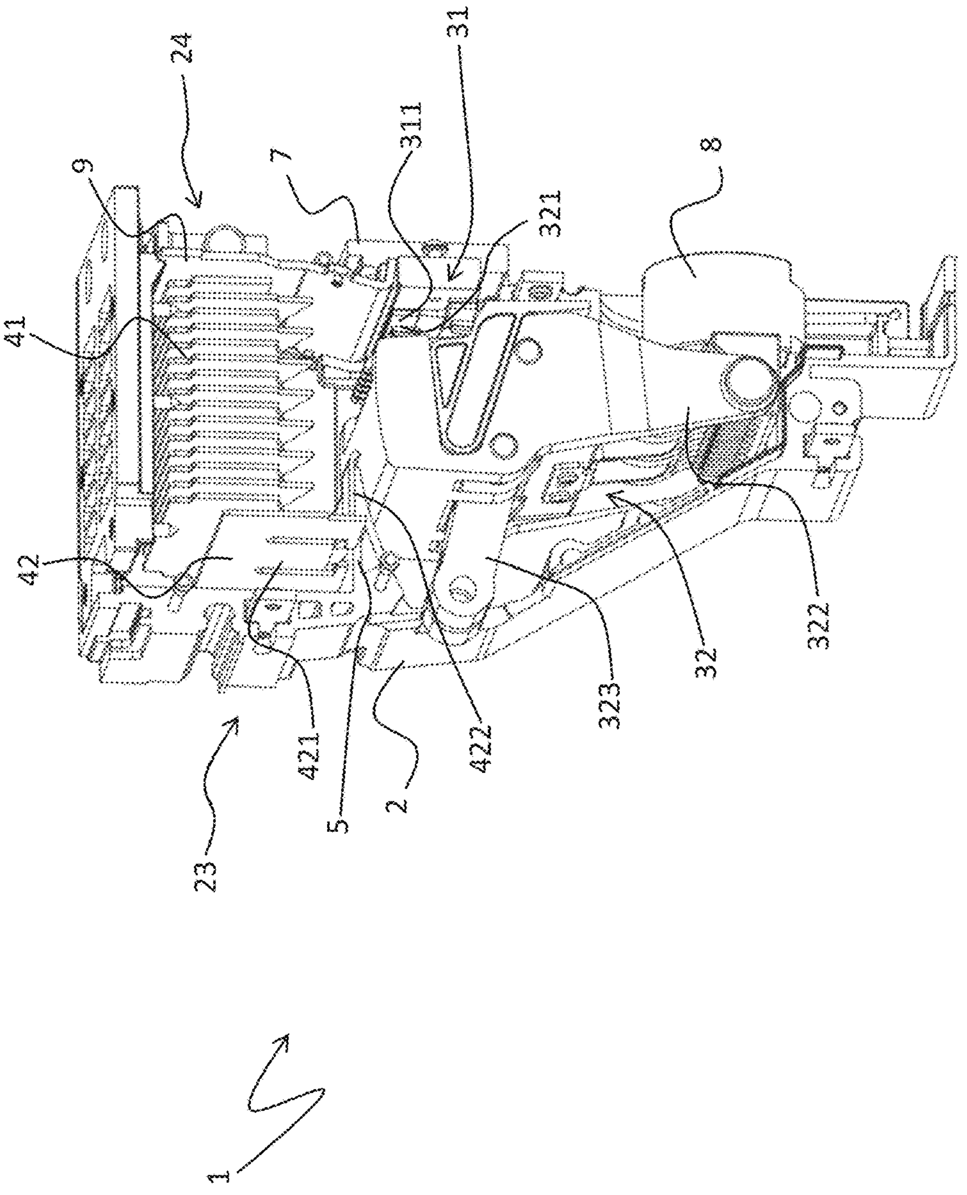
FIGS. 4 and 5 are views of the switch pole according to the present disclosure, in different operating conditions.
Figure 5:
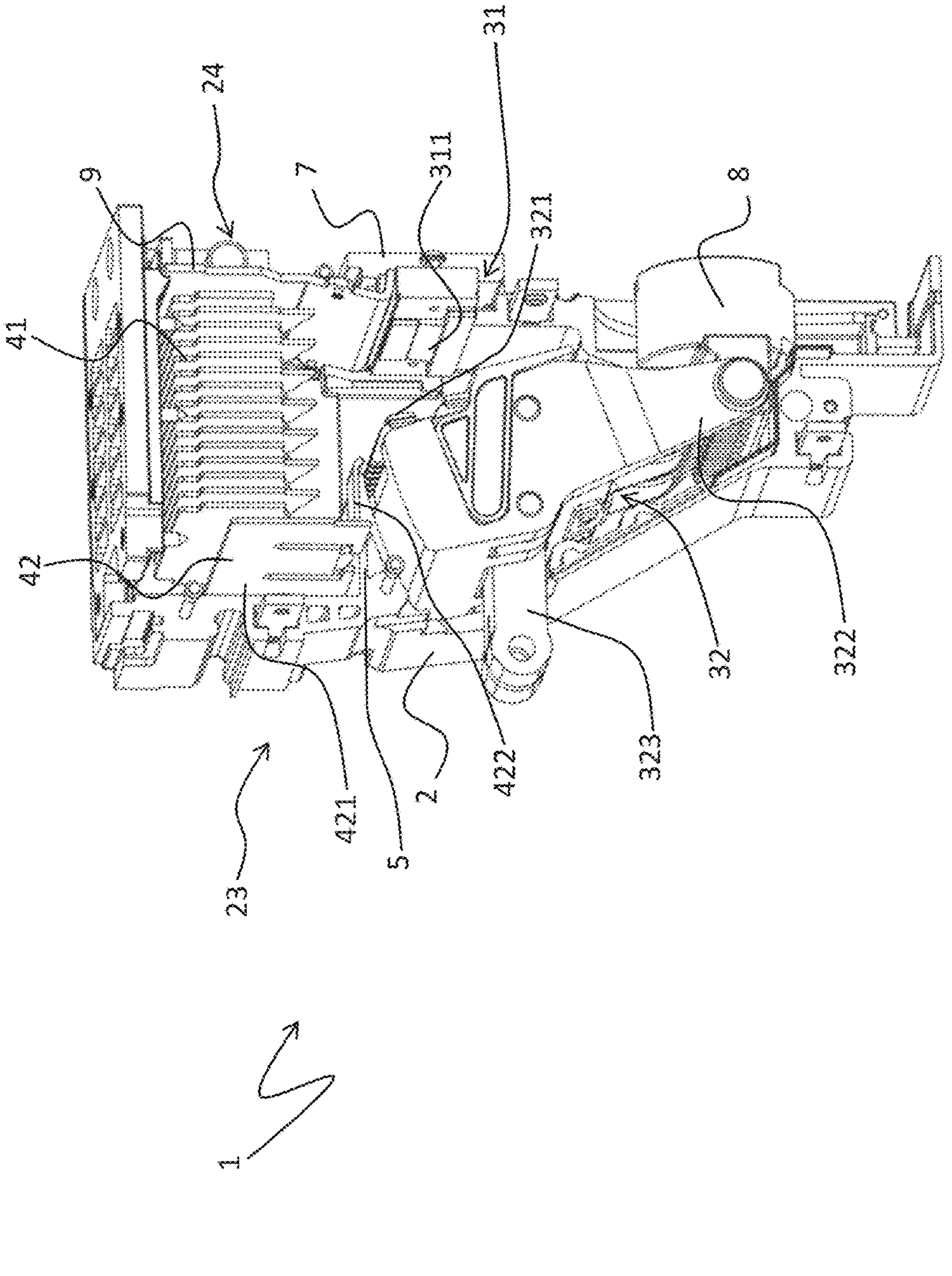

The plate portion 421 of the terminal arc-breaking element 42 has at least a through opening 420, which is designed to allow the passage of hot gases therethrough (FIGS. 3-5).

In principle, the number and shape of the openings 420 may be any, according to the needs.

The plate portion 421 includes a plurality of openings 420 formed by a pair of parallel slots extending in parallel to the lateral edges 421C for most of the length of these latter.

As mentioned above, the openings 420 in the plate portion of the terminal arc-breaking element 42 greatly favor the flow of hot gases away from the contact area 3 of the switch pole, towards the front wall 23 and, subsequently, the top wall 25 of the insulating casing 2.

The plate portion 421 may be formed by a plate made of metal or other conductive material.

According to the disclosure, the terminal arc-breaking element 42 further includes an elongated portion 422 protruding from the plate portion 421 (may be at the lower edge 421A of this latter) and extending from the plate portion 421 towards the fixed contact assembly 31, across the arc-extinguishing area 4.

As mentioned above, the elongated portion 422 of the arc-breaking element 42 is capable of catching and driving possible electric arcs formed between the electric contacts 311, 321 under separation towards a terminal portion of the arc chamber 4.

Electric arcs are thus urged to form throughout the whole arc chamber 4, thereby involving all the arc-breaking plates 41.

The elongated portion 422 may be formed by a lamina made of metal or other conductive material.

As shown in the cited figures, the elongated portion 422 is located at a lower level with respect to the arc-breaking plates 41, namely at a gap region 4A of the arc extinguishing area 4, which separates the contact area 3 and the arc-breaking plates 41, more particularly at the border between the arc contact area 3 and the arc extinguishing area 4 (FIGS. 10-11).

The elongated portion 422 may be positioned transversally (may be perpendicularly) to a number of arc-breaking plates 41, which are located in proximity of the plate portion 421.

In principle, the shape of the elongated portion 422 may be any, according to the needs (FIGS. 10-11).

The elongated portion 422 may be centered with respect to the plate portion 421 and it has a lower width compared to this latter.

The elongated portion 422 may have a first end 422A joined to the plate portion 421 and a second opposite free end 422B, which is curved towards the contact area 3 (FIG. 11).

As it will be more apparent from the following, this solution further helps to catch possible electric arcs between the electric contacts by the elongated portion 422.

The slots 420 of the plate portion 421 may be arranged symmetrically with respect to the elongated portion 422. In the embodiment of FIG. 12, the elongated portion 422 is arranged perpendicular to central symmetry plane perpendicular to the plate portion 421 and the slots 420 arranged symmetrically at both sides of said symmetry plane.

According to some embodiments of the disclosure (shown in the cited figures), the insulating casing 2 includes an insulating wall 5 partially separating the contact area 3 from the arc extinguishing area 4 in distal position from the fixed contact assembly 31.

The insulating wall 5 has a terminal edge 51 in correspondence of a middle portion of the contact area 3 (FIG. 11).

Conveniently, the insulating wall 5 defines the boundary between the contact area 3 and the arc extinguishing area 4 at the front wall 23 of the insulating casing 2. In this way, the contact area 3 and the arc extinguishing area 4 are in direct communication with each other in the region near the fixed contact assembly 31 (i.e. at the rear wall 24 of the insulating casing 2). Conversely, in the region near the front wall 23 of the insulating casing 2 (i.e. opposite to the fixed contact assembly 31), the contact area 3 and the arc extinguishing area 4 are isolated from each other by the insulating wall 5.

This solution greatly helps to reduce possible "jumps" of the electric arcs towards other conductive parts of the switch pole, which are located outside the arc-extinguishing area 4.

The insulating wall 5 may be integral with the front wall 23 and the opposite lateral walls 21, 22 of the insulating casing 2 and it extends from the front wall 23 towards the fixed contact assembly 31 and the rear wall 24.

The terminal arc-breaking element 42 leans on the insulating wall 5, thereby being supported by this latter. This solution greatly favors the arrangement of the terminal arc-breaking element 42 and, more, generally of the whole arc chamber, in particular when this latter can be removably installed.

The insulating wall 51 bears the elongated portion 422 and, possibly, the lower edge 421A of the plate portion 421 of the terminal arc-breaking element 42.

The curved free end 422B of the elongated portion 422 protrudes slightly from the terminal end of 51 the insulating wall 5 in such a way to be directly exposed to the contact area 3 of the switch pole. In this way, the arc catching action exerted by the elongated portion 422 is not limited by the presence of the insulating wall 5.

According to some embodiments of the disclosure (not shown), a channel is provided in the insulating wall 5. Such a channel is designed to put the contact area 3 into communication with the arc extinguishing area 4 in such a way to allow the passage of hot gas from the contact area 3 to the arc extinguishing area 4, thereby conveying the hot gases towards a terminal portion of the arc chamber 40 (where the plate portion 421 of the terminal arc-breaking element 42 is positioned), in proximity of the front wall 23 of the insulating casing 2. Obviously, this solution further improves the fluid-dynamics of hot gases towards a terminal portion of the arc chamber.

FIGS. 6-9 show the behavior of the switch pole 1 during an opening maneuver of the switching device 100.

Figure 6:
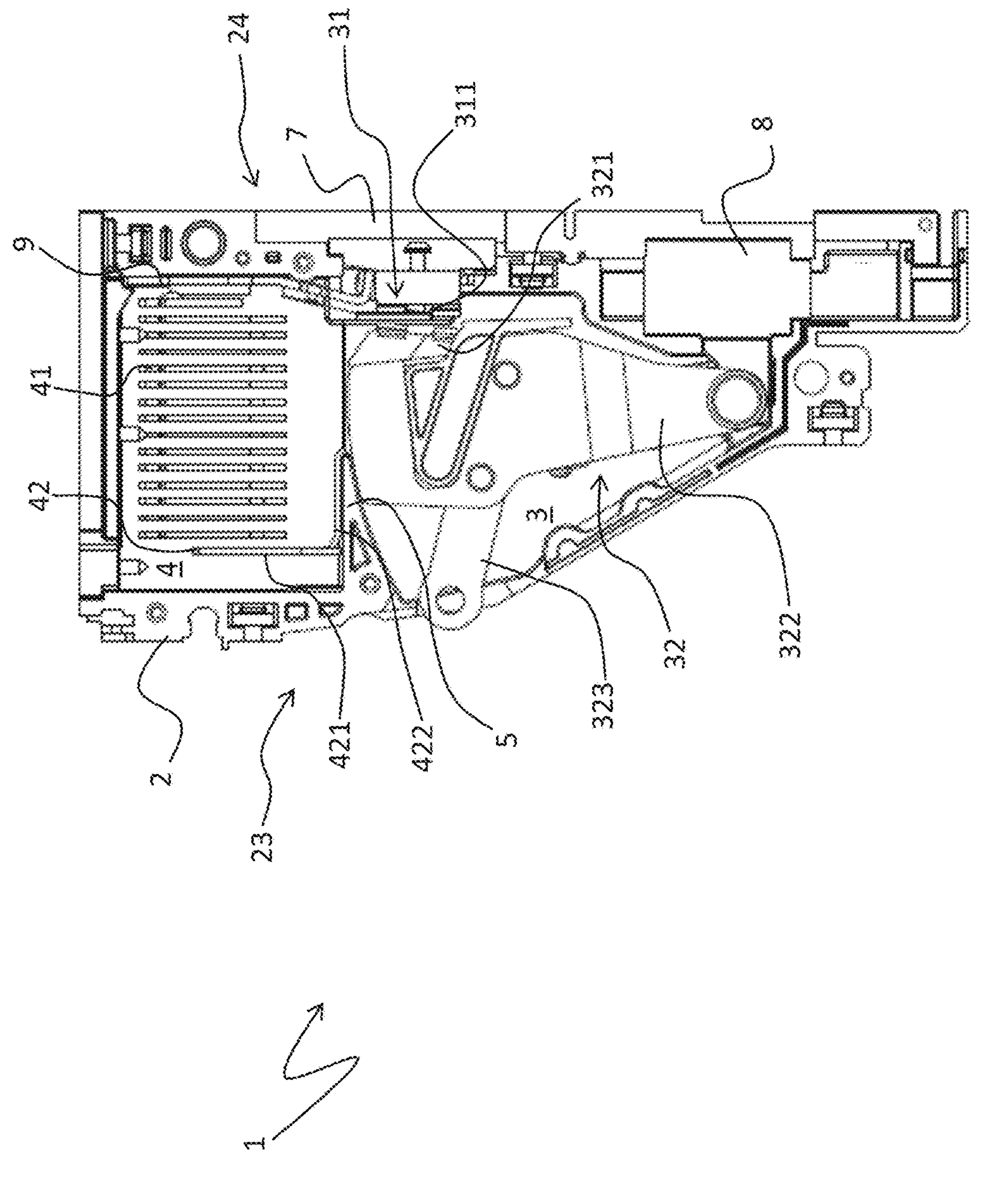
FIGS. 6-11 are further views of the switch pole according to the present disclosure, in different operating conditions.
Figure 7:
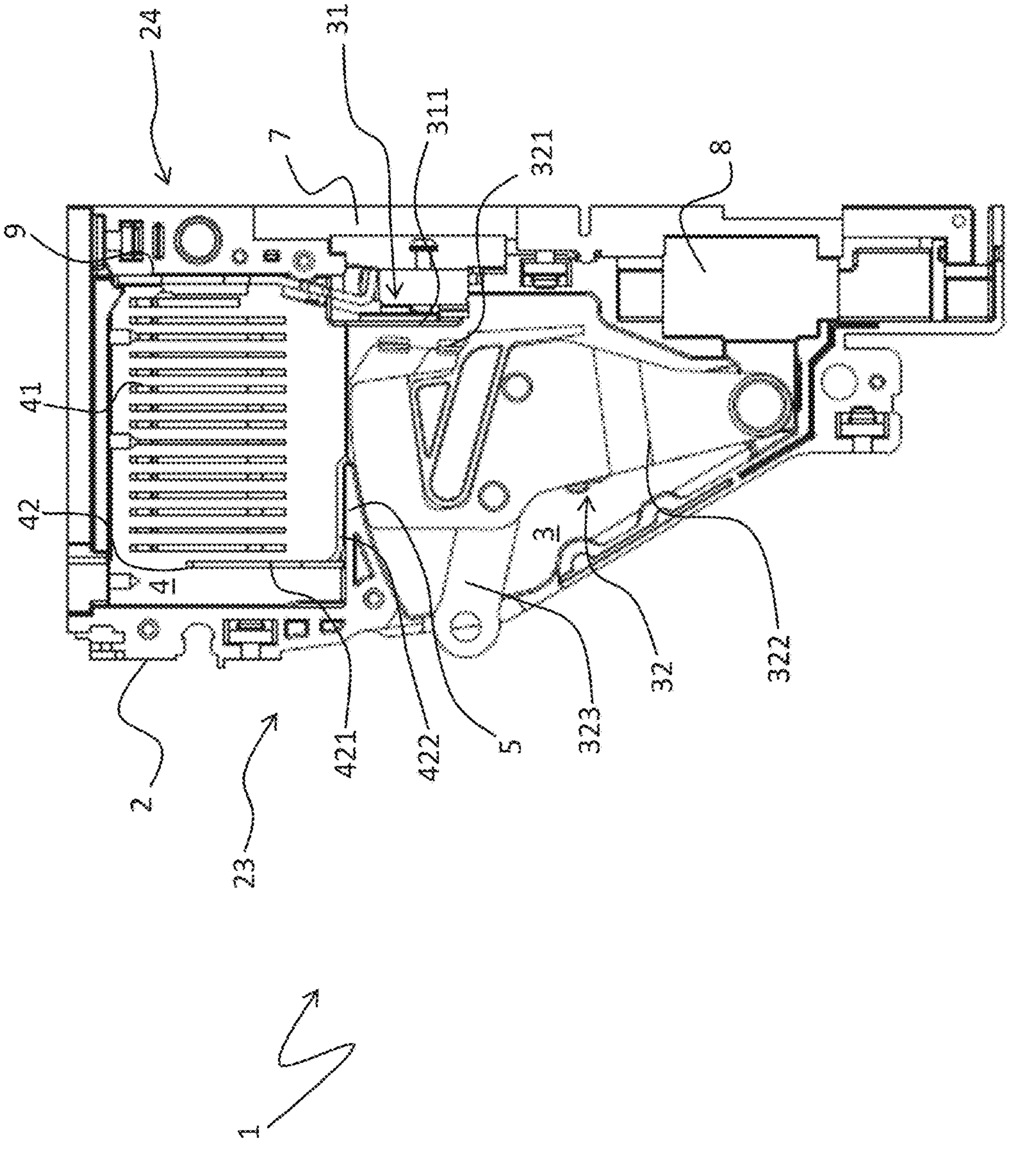

FIG. 6 shows the switch pole with the movable contacts 321 coupled to the fixed contacts 311 (closed condition of the switching device). In this situation, a current can flow along the switch pole between the pole terminals 7, 8 and no electric arcs develop between the electric contacts 311, 321.

During an opening maneuver, the movable contacts 321 are moved away from the fixed contacts 311.

As soon as the movable contacts 321 separate from the fixed contacts 311 (FIG. 7), a difference of voltage potential is established between said electric contacts (at any time, movable contacts 321 may have a positive voltage polarity while fixed contacts 311 have a negative voltage polarity, or vice-versa). Since the dielectric distance between the electric contacts 311, 321 is quite short, electric arcs initially develop between said electric contacts and in an initial part of the arc chamber, i.e. in proximity of the fixed contact assembly 31.

The high energy ionization effects of the air (dielectric medium) between the electric contacts leads to the generation of high-pressure hot gases.

As soon as the movable contacts 321 are sufficiently separated from the fixed contacts 311 (FIG. 8), electric arcs are caught by the elongated portion 422 of the terminal arc-breaking element 42. In fact, the elongated portion 422 has its free end 422B located in proximity of contact area 3, so that the movable contacts 321 pass at a very short distance from said elongated portion while moving away from the fixed contacts 311.

Figure 8:
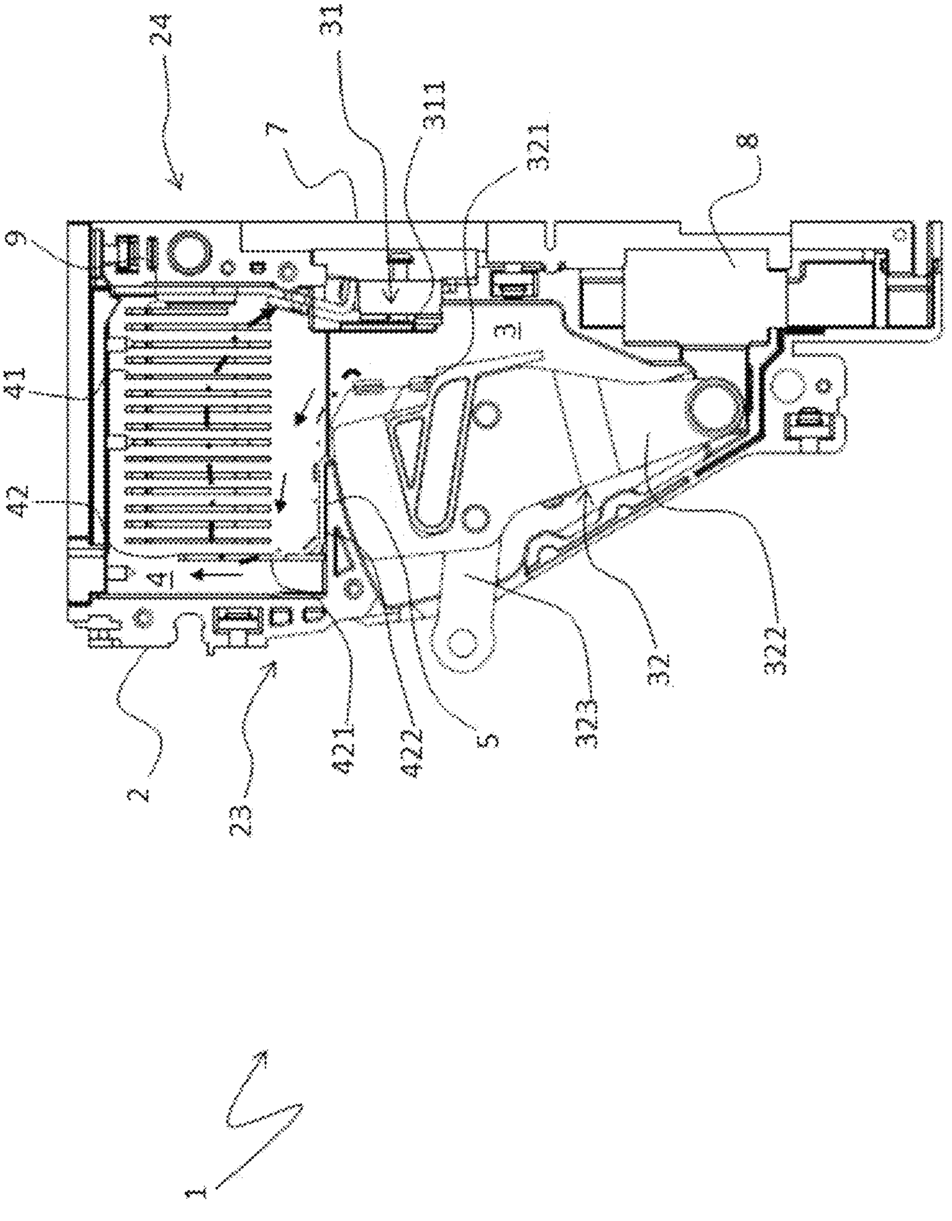
Figure 9:
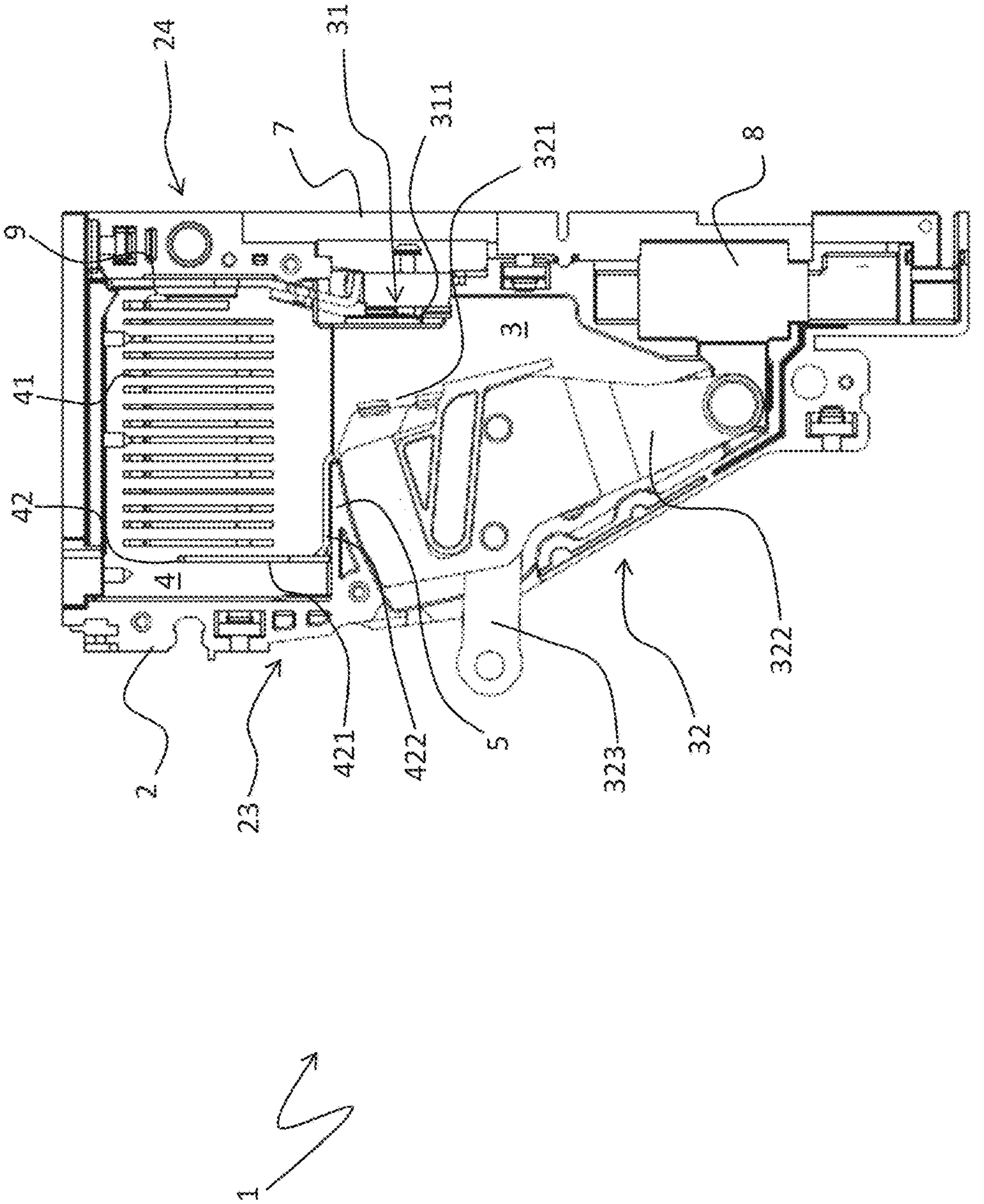

Electric arcs are thus forced to pass through the plate portion 421, the arc-breaking plates 41 and the conductive element 9 in order to go from the movable contacts 321 to the fixed contacts 311 (the path of the electric arcs is schematically represented by the dotted arrow of FIG. 8).

At the same time, thanks to the openings 420 in the plate portion 421 of the terminal arc-breaking element 42, hot gases are conveyed to the front wall 23 and, subsequently, to the top wall 25 of the insulating gases 2, which additionally favors the stripping the electric arcs towards the arc-breaking elements 41, 42 (the path of the hot gases is schematically represented by the solid arrows of FIG. 8).

Finally, when the movable contacts 321 reach a position corresponding to an open condition of the switching device, electric arcs may be finally quenched (FIG. 9), or continue their quenching process through the full extension of the portion arc-breaking elements 41, 42.

As is clear from the above description, the technical solutions adopted for the low voltage switch pole, according to the present disclosure, allow the proposed aims and the objects to be fully achieved.

Thanks to the particular structure of the terminal arc-breaking element, in the switch pole, according to the present disclosure, it is possible to obtain an optimal utilization of the arc-breaking elements of the arc chamber, which are progressively involved in the arcing phenomena during an opening maneuver of the switching device.

In particular, substantially all arc breaking plates of the arc chamber are involved in the quenching action of electric arcs, thereby allowing a more uniform utilization of the arc chamber. Less mechanical and thermal stresses are therefore generated into the arc chamber with a consequent prolonged lifetime of this latter.

At the same time, thanks to the openings provided in the plate portion of the terminal arc-breaking element, the fluid dynamics of the hot gases is greatly improved, thus further contributing to stripping the electric arcs throughout the arc chamber and improving the cooling of the movable contacts of the switch pole.

Thanks to the insulating wall at the boundary between the contact area and the arc-extinguishing area, the possibility for electric arcs to strike towards other conductive components of the switch pole, outside the arc-extinguishing area, is substantially avoided or greatly reduced.

As mentioned above, the present disclosure relates also to a low voltage switching device 100 including at least one low voltage switch pole 1 as previously described.

With reference to FIGS. 1 and 2, a three-pole low voltage circuit breaker 100 including three low voltage switch poles 1 (i.e. circuit breaker poles) is shown. In this embodiment, the insulating casing 2 of each switch pole 1 is made of two half shells, and the poles 1 are positioned side by side in a supporting a containing structure having rigid flanks 102, as well as a cover 101. From suitable windows in the front wall 23 of the insulating casing 2 of each switch pole 1, connecting elements 323 protrude outside for connection with a driving mechanism (not shown). The general structure of such low voltage circuit breaker 100 is, in general, well known in the art and therefore it will be not described in more details, for the sake of brevity.

What is claimed is:

1. A switch pole for a low voltage switching device comprising:

an insulating casing defining an internal space with a contact area and an arc extinguishing area of the switch pole;

a fixed contact assembly and a movable contact assembly positioned in the contact area and including, respectively, one or more fixed contacts and one or more movable contacts, which can be mutually coupled or uncoupled; and an arc chamber positioned in the arc extinguishing area and comprising a plurality of arc-breaking elements, wherein the arc-breaking elements comprise a plurality of parallel arc-breaking plates and a terminal arc-breaking element, the terminal arc-breaking element is arranged in distal position from the fixed contact assembly compared to the arc-breaking plates, wherein the terminal arc-breaking element comprises a plate portion, which is arranged in parallel to the arc-breaking plates and has one or more through openings, and an elongated portion, which protrudes from the plate portion and extends across the arc-extinguishing area, from the plate portion towards the fixed contact assembly, and wherein the insulating casing comprises an insulating wall partially separating the contact area from the arc extinguishing area in distal position from the fixed contact assembly, a terminal edge of the insulating wall abuts the elongated portion and a lower edge of the plate portion.

2. The switch pole according to claim 1, wherein the insulating casing has opposite front and rear walls, wherein the terminal arc-breaking element-is arranged at the front wall, wherein the fixed contact assembly is arranged at the rear wall, and wherein the arc-breaking plates are arranged at subsequent positions between the front wall and the rear wall.

3. The switch pole according to claim 1, wherein the terminal arc-breaking element is arranged in proximal position to the contact area compared to the arc-breaking plates.

4. The switch pole according to claim 1, wherein the elongated portion protrudes from the plate portion at the lower edge of the plate portion, which is in proximal position to the contact area.

5. The switch pole according to claim 1, wherein the elongated portion has a first end joined to the plate portion and a second free end, which is curved towards the contact area.

6. The switch pole according to claim 5, wherein the second free end of the elongated portion protrudes from the insulating wall, so as to be exposed directly to the contact area.

7. The switch pole according to claim 6, wherein the insulating wall is integral with a front wall and opposite lateral walls of the insulating casing and extends from the front wall towards the fixed contact assembly.

8. The switch pole according to claim 1, wherein the plate portion comprises a plurality of openings formed by a pair of slots arranged in parallel to corresponding lateral edges of the plate portion and arranged symmetrically relative to the elongated portion.

9. The switch pole according to claim 1, wherein the arc chamber comprises an insulating enclosure that can be removably fixed to the insulating casing, and wherein the arc-breaking elements are fixed to the insulating enclosure.

10. The switch pole according to claim 1, wherein the terminal arc-breaking element is leaning on the insulating wall.

11. The switch pole according to claim 10, wherein the insulating wall is integral with a front wall and opposite lateral walls of the insulating casing and extends from the front wall towards the fixed contact assembly.

12. The switch pole according to claim 10, wherein a second free end of the elongated portion protrudes from the insulating wall, so as to be exposed directly to the contact area.

13. A low voltage switching device, wherein the low voltage switching device comprises a switch pole according to claim 1.

* * * * *